J. L. Dickinson.
Safety Harness-Hook.
No. 73958. Patented Feb. 4, 1868.
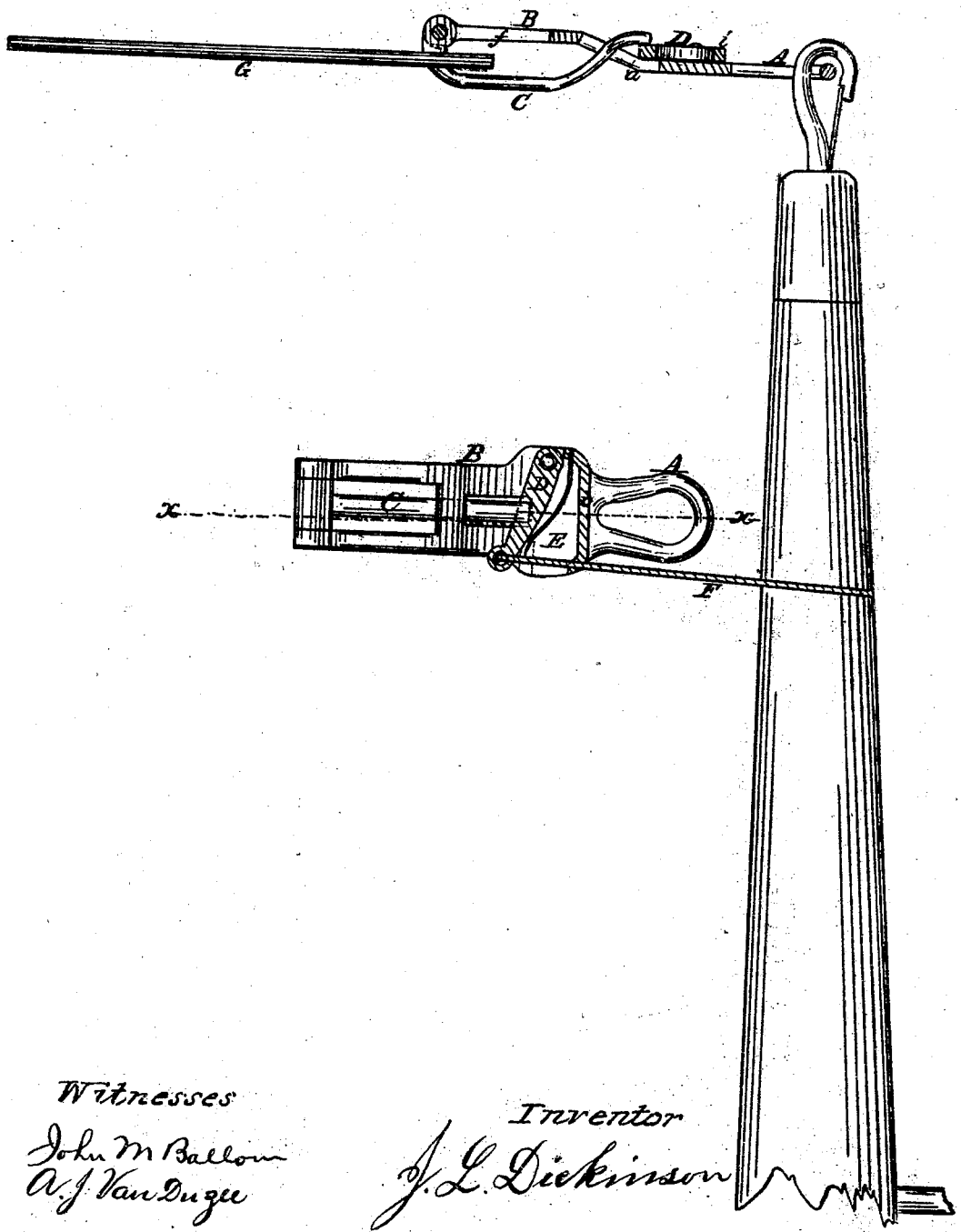
Witnesses
John M Ballou
A. J. Van Duzee
Inventor
J. L. Dickinson

United States Patent Office.

J. L. DICKINSON, OF DUBUQUE, IOWA.

Letters Patent No. 73,958, dated February 4, 1868.

---

IMPROVED SAFETY HARNESS-HOOK.

---

*The Schedule referred to in these Letters Patent and making part of the same.*

---

TO ALL WHOM IT MAY CONCERN:

Be it known that I, J. L. DICKINSON, of Dubuque, in the county of Dubuque, and State of Iowa, have invented a new and improved Safety Harness-Hook; and I do hereby declare that the following is a full, clear, and exact description thereof, which will enable others skilled in the art to make and use the same, reference being had to the accompanying drawings, forming part of this specification.

The object of this invention is to provide a hook for fastening the traces and straps of a harness, and attaching the horses to a carriage, in such a manner that the horses can be easily and instantly detached therefrom, thereby insuring the safety of the passengers, and preventing dangerous results, in case the horses become unruly; and the invention consists in a jointed tongue, to which the trace or strap is attached, which tongue is held in place by a spring-latch on a suitably-constructed loop-piece or plate, and in the general construction and arrangement of parts, as will be hereinafter described.

Figure 1 represents a longitudinal section of the safety-hook attached to a whiffle-tree, the section being through the line $x\ x$ of fig. 2, the whiffle-tree being seen in red.

Figure 2 is a top view of the hook, with the liberating-cord attached to the latch.

Similar letters of reference indicate corresponding parts.

As seen in fig. 2, A is the loop proper, by which the hook is attached to the whiffle-tree; B represents the loop-piece or plate of the safety-hook; C is the tongue, to which the trace is attached; D is the latch, and E is a spring, which bears against the latch with a constant pressure; F is the detaching-cord, seen in red; G represents the trace, fig. 1.

The safety-hook is seen in fig. 1 attached to the whiffle-tree, as when in use, and its form and general construction are plainly shown in the drawing. The tongue C is hinged to the plate B at H, and is held in the position seen in fig. 1 by the latch, which is forced under the end of the tongue by the spring E. $a$ represents an opening in the plate, through which the end of the tongue passes, as seen. $f$ is another opening in the plate, at the outer end of which the tongue is attached by a rivet, on which it turns, forming a joint. $i$ is a projecting flange on the plate B, to which the spring is attached. This flange forms a stop for the latch, to prevent its being drawn too far back by the cord. The hold-back straps, for one or two-horse carriages, are attached to the thills and pole in the same manner, or by this hook, and the liberating-cords fastened to the latch, as seen in fig. 2, are attached to a lever, or otherwise brought within the immediate control of the driver, and arranged so that, by a single motion, the latches are withdrawn simultaneously, and the horse or horses detached from the carriage.

It will be seen that pressure on the tongue C, caused by the draught on the traces or straps, will, when the latches are thus withdrawn by the drive, cause them to fly back and liberate the traces or straps instantly.

Having thus described my invention, what I claim as new, and desire to secure by Letters Patent, is—

A safety harness-hook, for liberating horses from carriages, constructed and operating substantially as herein shown and described.

J. L. DICKINSON.

Witnesses:
W. W. SMITH,
T. J. KIRKWOOD.